United States Patent [19]
Levi

[11] Patent Number: 5,214,562
[45] Date of Patent: May 25, 1993

[54] ELECTROSTATIC DISCHARGE PROTECTIVE CIRCUIT OF SHUNTING TRANSISTORS

[75] Inventor: Mark W. Levi, Utica, N.Y.

[73] Assignee: The United States of America as represented by the Secretary of the Air Force, Washington, D.C.

[21] Appl. No.: 715,163

[22] Filed: Jun. 14, 1991

[51] Int. Cl.[5] .......... H05F 3/00; H02H 9/00
[52] U.S. Cl. .......... 361/212; 361/56; 307/100
[58] Field of Search .......... 361/56, 58, 54, 111, 361/212, 91; 357/23.12, 23.13; 307/100, 574, 581

[56] References Cited

U.S. PATENT DOCUMENTS

| | | | |
|---|---|---|---|
| 3,636,385 | 1/1972 | Koepp | 307/304 |
| 4,385,337 | 5/1983 | Asano et al. | 361/91 |
| 4,456,939 | 6/1984 | Ozaki et al. | 361/56 |
| 4,617,605 | 10/1986 | Obrecht et al. | 361/220 |
| 4,752,862 | 6/1988 | Takahashi et al. | 361/403 |
| 4,791,524 | 12/1988 | Teigen et al. | 361/212 |
| 4,821,320 | 4/1989 | Andert et al. | 379/437 |
| 4,864,458 | 9/1989 | Demorat, Jr. et al. | 361/212 |
| 4,889,750 | 12/1989 | Wiley | 428/34.2 |
| 4,958,255 | 9/1990 | Pritchard | 361/212 |

Primary Examiner—A. D. Pellinen
Assistant Examiner—David Osborn
Attorney, Agent, or Firm—William Stepanishen; Donald J. Singer

[57] ABSTRACT

An electrostatic discharge protective apparatus for an integrated circuit having normally on semiconductor devices mutually connecting input/output pads and the power in bonding pad to prevent stray electrostatic discharges from damaging the integrated circuit components when the integrated circuit is not powered on. All adjacent input/output pads are connected to each other by a normally on transistor. Each pad is additionally connected to a power supply pad by a normally on transistor.

4 Claims, 1 Drawing Sheet

ELECTROSTATIC DISCHARGE PROTECTIVE CIRCUIT OF SHUNTING TRANSISTORS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a discharge protection apparatus, and in particular to an electrostatic discharge protective apparatus for integrated circuits.

The state of the art of electrostatic discharge protective apparatus is well represented and alleviated to some degree by the prior art apparatus and approaches which are contained in the following U.S. Patents:

U.S. Pat. No. 4,752,862 issued to Takahashi et al on Jun. 21, 1988;
U.S. Pat. No. 4,791,524 issued to Teigen et al on Dec. 13, 1988;
U.S. Pat. No. 4,821,320 issued to Andert et al on Apr. 11, 1989;
U.S. Pat. No. 4,864,458 issued to Demorat et al on Sep. 5, 1989;
U.S. Pat. No. 4,889,750 issued to Wiley on Dec. 26, 1989; and
U.S. Pat. No. 4,958,255 issued to Pritchard on Sep. 18, 1990.

The Takahashi et al patent discloses an electronic device that has immunity against the phenomena of static electricity which comprises a metal housing containing an electronic circuit which maintains an ordinary potential of the input line by inducing a pull potential on the input line of the electronic circuit network in order to eliminate the induction of active potentials other than an active potential for operating the device, thereby to prevent erroneous inputs from entering thereto.

The Teigen et al patent describes electrostatic discharge for electronic packages comprising a circuit card which has a conductive bracket (or frame or cover) which contacts the conductive frame (or cage or enclosure) of an assembly before the circuit can electrically connect to a bus or other circuit in the assembly. A high-value resistor between circuit ground and the bracket allows static charge to dissipate to frame ground harmlessly.

The Andert et al patent discloses a device for protecting both the operator of an electronic apparatus and the electronic equipment of the apparatus when the operator carries a high electrostatic charge. To ensure a gentle electrostatic discharge of the operator, resistance paths which lead to a ground point of the electronic apparatus are arranged in the danger zone of the apparatus.

The Demorat Jr. et al patent is directed to a switching device on a printed circuit card assembly which permits the signal ground of the printed circuit card to be grounded to the machine ground during insertion of the card into the frame of the machine, and when the card is fully inserted the switch is opened to allow the signal ground of the card to be electrically isolated from the machine ground of the frame.

The Wiley patent describes coatings and foams which are useful in providing a conductive layer on a surface to provide protection against harmful electrostatic discharges, and are also useful in absorbing and dissipating mechanical and electromagnetic energy and preventing electrostatic build-up; these compositions also provide electromagnetic compatibility.

The Pritchard patent discusses a protection circuit which connects differentiated grounds in an electronic system either by a single diode, or by two diodes arranged in a back-to-back, parallel fashion. The differential grounds may include a chasis ground, a logic ground and an earth ground. The circuit locally connects two of the differentiated grounds, thereby providing a low inductance path for the fast discharging of electrostatic charge build-ups.

Integrated circuits are generally provided with some sort of electrostatic discharge (ESD) protective circuit for each input bonding pad. It is also fairly common to design outputs either in such a way that they are inherently resistant to electrostatic discharge or to provide them, also, with a protective circuit. These pads will be referred to as input/output pads, (I/O). While the above description is general, it is particularly descriptive of digital inputs and outputs. The circuits which are presently used, incorporate devices which have extremely non-linear voltage characteristics to establish a connection between the protected input or output and either a "ground" or a "power supply" lead(s). The non-linearity is such that a voltage within the normal operating range of the input/output pads will result in a negligible current through the device, but a larger voltage applied will result in sufficient current being drawn that a small series impedance will limit the voltage "seen" by following circuits. There are two consequences to providing electrostatic discharge protection in that way: 1) There is a time delay between the time that a high voltage pulse is applied and the protection becomes effective; 2) The power dissipation in the protective device is quite large, being given by the product of the input current supplied by the pulse and the limiting voltage of the protective device. Electrostatic discharge is most commonly found to occur during handling and/or manufacture of the integrated circuit; once an integrated circuit has been installed in the apparatus in which it is to be used the risk from electrostatic discharge is drastically reduced by the relatively large capacitances to which each input/output pad is connected and by the fact that a relatively insensitive output provided additional protection to any inputs which it drives. It is consequently the common practice to require extreme care in the handling, testing and installation of integrated circuits with requirements for grounding straps to personnel, humidification controls, special conducting surfaces combined with air ionization etc. All of these are intended to reduce the probability of having charges build to the point that an electronic discharge can happen. Furthermore, the devices in the integrated circuit can usually not protect it from electrostatic discharge during the time that the integrated circuit is being manufactured, i.e., the wafer level.

SUMMARY OF THE INVENTION

The present invention utilizes depletion mode transistors or normally on junction transistors between each pair of adjacent I/O pads along with other such normally conductive devices between each pad and a common terminal VSS/DD bonding pad which would usually be connected to the ground terminal. The power supply terminal can also be so connected, provided the protective devices to which it is connected have a sufficiently high resistance to avoid excessive current when the IC is first powered. A biasing generator causes each of the normally conductive devices to become non-conducting after normal power supply voltage has been applied to the IC for a short time.

It is one object of the present invention, therefore, to provide an improved electrostatic discharge protective apparatus.

It is another object of the present invention to provide an improved electrostatic discharge protective apparatus wherein conductive transistor devices are connected between each pair of adjacent pads on a integrated circuit.

It is yet another object of the present invention to provide an improved electrostatic discharge protective apparatus wherein a biasing generator turns the protective transistor devices off after normal supply voltage has been applied to the integrated circuit.

It is still another object of the present invention to provide an improved electrostatic discharge protective apparatus wherein a low pass filter is connected between the bias generator and the controlling terminals of the conductive transistors to prevent electrostatic discharges which might otherwise momentarily power the bias circuit of the integrated circuit.

These and other advantages, objects and features of the invention will become more apparent after considering the following description taken in conjunction with the illustrative embodiment in the accompanying drawings.

BRIEF DESCRIPTION OF THE DRAWINGS

There is shown in the sole FIGURE a schematic diagram of the electrostatic discharge apparatus according to the present invention.

DESCRIPTION OF THE PREFERRED EMBODIMENT

Figure 1:
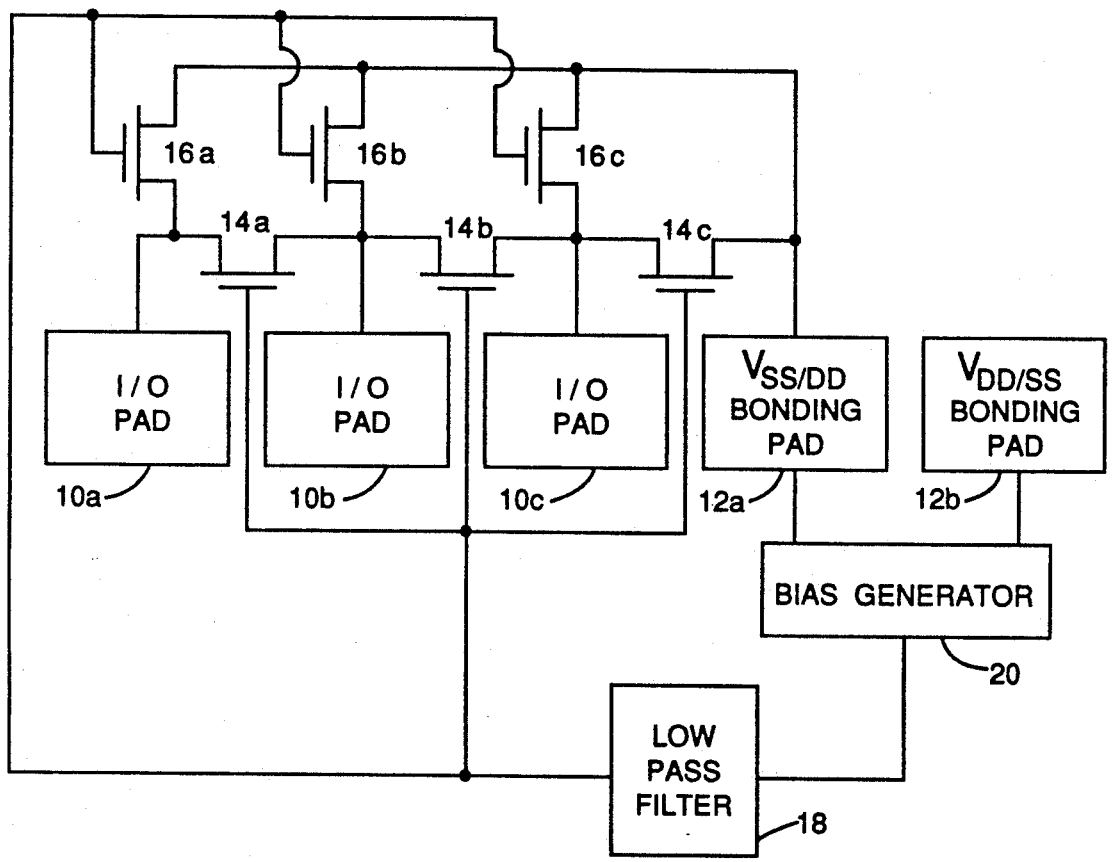

Referring now to the sole FIGURE there is shown a schematic diagram of the electrostatic discharge protective apparatus. The electrostatic discharge protective apparatus prevents static electrical charges from building up and discharging between bonding pads on an integrated circuit substrate when the power to the circuit is off. For the purposes of illustration, three input/output (I/O) pads 10a, 10b and 10c and two power source bonding pads 12a, 12b which are part of an electrical circuit on an integrated circuit substrate (not shown) are provided. Semiconductor units 14a, 14b and 14c are respectively connected between adjacent input/output pads 10a, 10b, 10c and Vss/DD bonding pad 12a. A second group of semiconductor units 16a, 16b and 16c are connected between the respective input/output pads 10a, 10b and 10c and the Vss/DD bonding pad 12a and the substrate. In the present example, the semiconductor units 14a, 14b, 14c and 16a, 16b and 16c are shown as depletion mode transistors. However, it should be well understood that any suitable semiconductor devices, such as a normally on junction transistor, may be herein utilized. A similar such circuit as shown with respect to Vss/DD bonding pad 12a and I/O pads 10a, 10b, 10c may also be provided for VDD/SS bonding pad 12b and other pads. The present invention may protect any number of input/output pads and power bonding pads. A low pass filter unit 18 is provided in series with the bias generator unit 20 and the respective gates of the transistor devices 14a, 14b, 14c and 16a, 16b, 16c. The preferred implementation includes both groups of semiconductor units, but all or part of the first group (14a, 14b, 14c) could be left out.

The present invention operates in the following manner. The electrostatic discharge protective apparatus utilizes transistor units 14a, 14b and 14c which are normally conductive between each pair of adjacent I/O pads 10a, 10b and 10c, along with other normally conductive transistor units 16a, 16b and 16c. The transistor units 16a, 16b and 16c are connected between each such pads 10a, 10b, 10c and a common terminal 12a which would usually be the "ground" and substrate terminal. The power supply terminal (not shown) can also be so connected, provided that the protective devices to which it is connected have a sufficiently high resistance to avoid excessive current when power is first applied to the integrated circuit. In addition, a biasing generator 20 is provided on the integrated circuit which will cause each of the normally conducting devices 14a, 14b, 14c and 16a, 16b and 16c to become non-conducting after the normal power supply voltage has been applied to the integrated circuit for a short time exceeding the duration of an electrostatic discharge. This operation may be achieved by circuits similar to those commonly used to provide substrate bias. A simple low pass filter unit 18 is used to prevent an electrostatic discharge pulse from applying the bias in those cases that the biasing generator has not already achieved that function. Since the semiconductor devices are to be of the depletion mode or normally-on junction transistors, it is possible to have them provide their protective function at the manufacturing or "wafer level" of production.

The present invention provides a number of advantages and new features. The electrostatic discharge apparatus provides protection against electrostatic discharge during and after manufacture and does so without the delay in providing protection required by conventional electrostatic discharge protective circuits. It also will be able to absorb larger surges than conventional protection by virtue of a smaller voltage drop during the protective act and the sharing of discharge currents among many protective devices rather than only one which is typical of existing practice. It provides protection particularly during the critical times before installation and thus will make the provisions for extremely careful handling of existing circuits unnecessary.

This protection can be combined with conventional protection circuits. In particular, a common feature found in input protection networks is a series resistor combined with a shunt transistor of enhancement type which is used in a punchthrough mode with its gate and source connected together and grounded. Since depletion mode devices can also be operated in a punchthrough mode, using a depletion device at this location would provide two stages of protection when the integrated circuit was not powered, and one stage when it was powered.

Although the invention has been described with reference to a particular embodiment, it will be understood to those skilled in the art that the invention is capable of a variety of alternative embodiments within the spirit and scope of the appended claims.

What is claimed is:

1. An electrostatic discharge protective apparatus for an electronic circuit on an integrated circuit substrate comprising in combination:

a plurality of input/output pads arranged in proximity to one another, a conductor arranged in proximity to each input/output pad of said plurality of input/output pads and electrically connected to a further bonding pad, a first plurality of semiconductor devices operatively connected respectively between adjacent input/output pads of said plurality of input/output pads and said bonding pad, each semiconductor device of said first plurality of semiconductor devices is normally on, a second plurality of semiconductor devices operatively connected respectively to each input/output pad of said plurality of input/output pads and to said conductor, and, each semiconductor device of said second plurality of semiconductor devices is normally on, and means for generating delayed bias and delivering said bias to the controlling terminals of said first and second plurality of semiconductor devices, upon receipt of power to said electronic circuit; said delayed bias means turns off said first and second pluralities of semiconductor devices.

2. An electrostatic discharge protective apparatus as described in claim 1 wherein said delayed bias is removed upon losing power to said electronic circuit.

3. According to claim 2 wherein the semiconductor devices of said first and second pluralities comprise a selection of depletion mode transistors and/or normally-on junction-transistors.

4. According to claim 1 wherein the semiconductor devices of said first and second pluralities comprise a selection of depletion mode transistors and/or normally-on junction-transistors.

* * * * *